(12) United States Patent
Russ et al.

(10) Patent No.: US 8,364,015 B2
(45) Date of Patent: Jan. 29, 2013

(54) STRETCH AND ZOOM BAR FOR DISPLAYING INFORMATION

(76) Inventors: Samuel H. Russ, Lawrenceville, GA (US); Gary D. Hibbard, Suwanee, GA (US)

( * ) Notice: Subject to any disclaimer, the term of this patent is extended or adjusted under 35 U.S.C. 154(b) by 1266 days.

(21) Appl. No.: 11/427,060

(22) Filed: Jun. 28, 2006

(65) Prior Publication Data

US 2008/0036914 A1 Feb. 14, 2008

(51) Int. Cl.
H04N 5/92 (2006.01)
(52) U.S. Cl. .................................... 386/245
(58) Field of Classification Search .............. 386/46, 386/83, 95; 725/44
See application file for complete search history.

(56) References Cited

U.S. PATENT DOCUMENTS

| | | | |
|---|---|---|---|
| 6,982,780 B2* | 1/2006 | Morley et al. | 352/38 |
| 2002/0159750 A1* | 10/2002 | Jasinschi et al. | 386/46 |
| 2002/0184632 A1 | 12/2002 | Reitmeier | |
| 2004/0006767 A1* | 1/2004 | Robson et al. | 725/28 |
| 2004/0107439 A1 | 6/2004 | Hassell et al. | |
| 2004/0255321 A1 | 12/2004 | Matz | |
| 2006/0053230 A1* | 3/2006 | Montero | 709/238 |
| 2006/0075449 A1* | 4/2006 | Jagadeesan et al. | 725/113 |

FOREIGN PATENT DOCUMENTS

| | | |
|---|---|---|
| WO | WO 98/48566 | 10/1998 |
| WO | WO 00/59220 | 10/2000 |
| WO | WO 01/50742 A1 | 7/2001 |

OTHER PUBLICATIONS

International Search Report of PCT application No. PCT/US2007/070753 mailed Dec. 5, 2007.
European patent application No. 07798307.0 EPO communication dated Oct. 21, 2009.
Canadian Office Action mailed Jul. 14, 2010 in Application No. 2,655,549.
Canadian Office Action mailed Jan. 24, 2012 in Application No. 2,655,549.
European Summons to Attend Oral Proceedings mailed Apr. 25, 2012 in Application No. 07798307.0, 4 pgs.

* cited by examiner

*Primary Examiner* — Huy T Nguyen
(74) *Attorney, Agent, or Firm* — Merchant & Gould (57) ABSTRACT

The present invention is directed towards enabling a set-top box, a cable card, or a television to insert data into horizontal or vertical bars on a display image. More specifically, when an aspect ratio of a program is converted, letterboxing bars are used either along the horizontal or vertical edges. Within these edges, data is then composited at appropriate times to display such things as program information, television information, personal settings, etc. Additionally, graphical bars may be rendered in order to block any received data from being inserted into these bars.

26 Claims, 6 Drawing Sheets

STRETCH AND ZOOM BAR FOR DISPLAYING INFORMATION

TECHNICAL FIELD

The present invention is generally related to a communications system and, more particularly, is related to a system and method for displaying information or other data in spaces bordering a display viewing image.

BACKGROUND OF THE INVENTION

Figure 1:
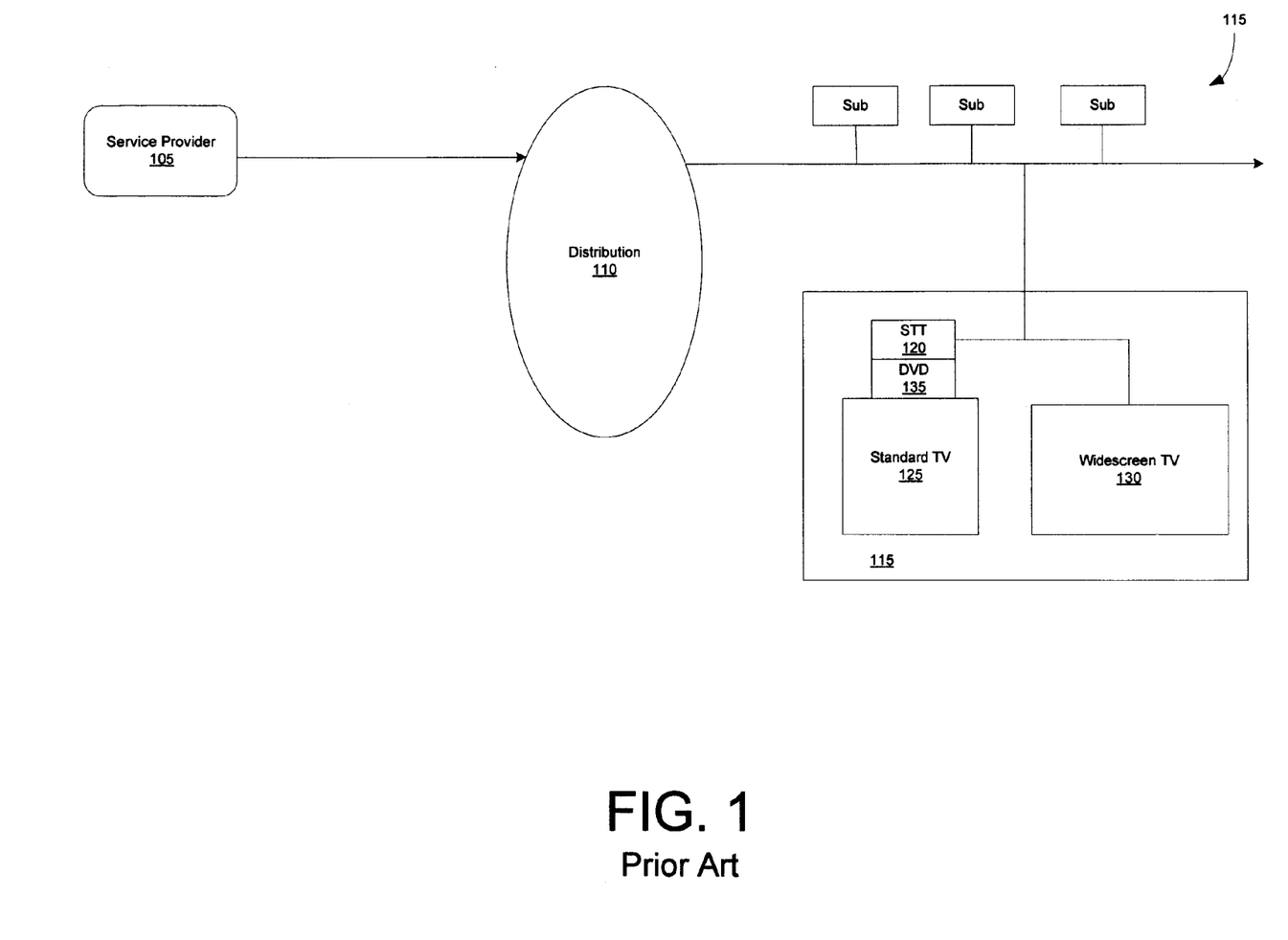
FIG. 1 is a block diagram of a service provider that transmits programs over a distribution plant to a plurality of subscribers, where the subscribers may have set-top boxes (STTs), normal, or full size, televisions, and/or widescreen televisions.

Currently, as shown in FIG. 1, service providers 105 transmit programs over a distribution plant 110 to a plurality of subscribers 115, where the subscribers may receive the programming by set-top boxes (STTs) 120, normal, or full size, televisions 125, and/or widescreen televisions 130, and the programming may be provided in either high-definition or standard definition. The high-definition television (HDTV) revolution has led to service providers 105 frequently converting program content between 4:3 and 16:9 aspect ratios. It will be appreciated that the 4:3 aspect ratio is common for standard-definition television (SDTV) programming and the 16:9 is common for HDTV programming and movies. In order to display 16:9 content on a 4:3 screen, letterboxing is used in which horizontal bars are inserted at the top and bottom of a display screen. This is done with many presentations recorded onto digital video discs (DVDs) now, for example. Similarly, in order to display 4:3 content on a 16:9 screen, vertical bars are added to the sides of the screen. Additionally, STTs perform this conversion as well if standard definition content is tuned and a high definition output on the STT was selected and if high definition content is tuned and a standard definition output was selected.

When the STTs perform the aspect ratio conversion, a featureless medium-grey background to minimize burn-in on the screen is typically displayed in the horizontal or vertical bars. It may be advantageous to the system provider, content providers, and television manufacturers to be able to present data, such as advertising, program information, or other data, that is inserted into the horizontal or vertical bars. On the other hand, it may be advantageous to some to prevent information or data from being inserted into these bars. There is a need, therefore, for systems and methods that allow a service provider or a television manufacturer to insert data in specific areas of a display screen or alternatively to block any data insertions.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

The preferred embodiments of the invention now will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. Furthermore, all "examples" given herein are intended to be non-limiting.

The present invention is directed towards the enablement of allowing service providers or television manufacturers, to name a couple, the ability to insert information or other data into borders of a display screen. More specifically, data provided along with conventional programming is inserted into either horizontal bars or vertical bars outside the display viewing image depending upon the application. It will be appreciated that the data may also be resident in an STT, a television, or a digital video disc (DVD) at time of manufacturing the product or downloaded after installation and stored in memory. Alternatively, a service provider or a television manufacturer can prevent data from being inserted into these bars, if desired. In one embodiment of the present invention, cable set-top boxes (STTs) perform the necessary conversions and insertions of data and will be explained in further detail below. In another embodiment, it is possible for a cable-ready television, which receives and decrypts programming without an STT, to perform the necessary conversions and insertions of the data. In a further embodiment, a cable card, which typically decrypts encrypted content, may also be used to either provide decrypted streams to a television that then composites the streams, or the cable card composites the streams and provides a television a single composited stream. Again, it is also possible for both the STT and/or television to prevent the insertions of unauthorized data. It will also be appreciated that other electronic devices, such as DVD players, can also be adapted to provide stored or received advertising, such as advertising received from a DVD, to an STT or a television for insertion.

Figure 2:
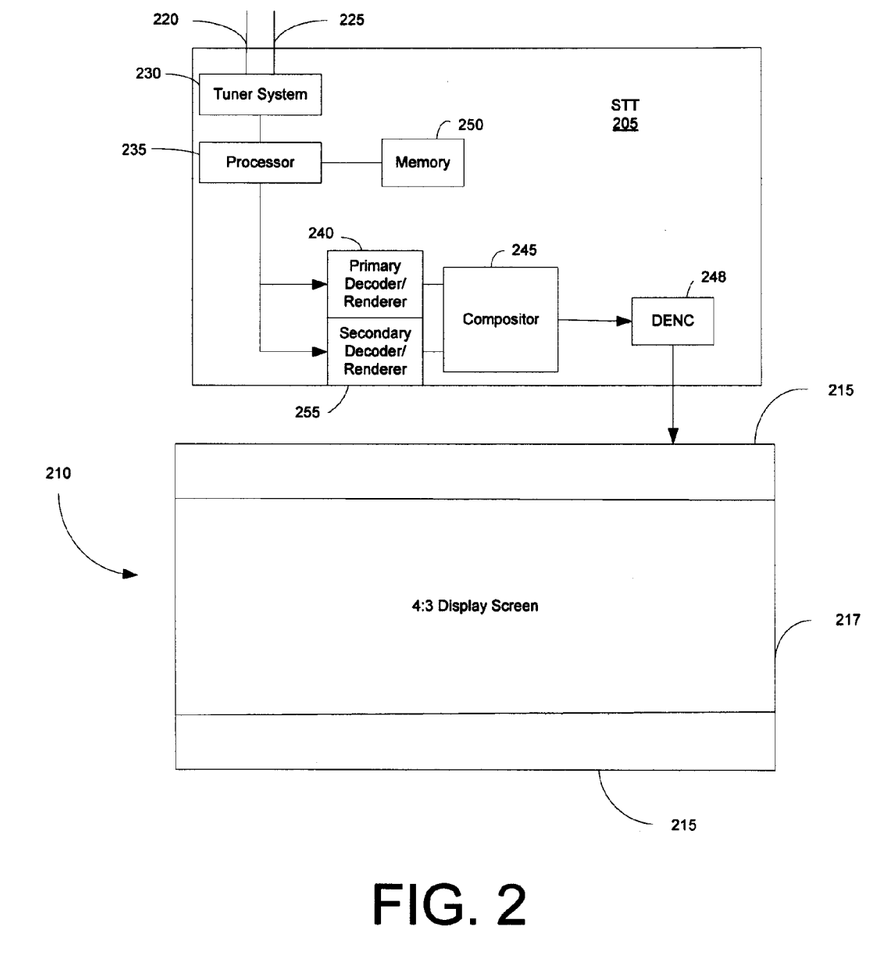
FIG. 2 is a block diagram of a set-top box (STT) 205 coupled to a television 210 that is capable of displaying data space in horizontal bars 215 on the top and the bottom of a display screen 217 in accordance with the present invention.

FIG. 2 is a block diagram of a set-top box (STT) 205 coupled to a television 210 that is capable of displaying data in horizontal bars 215, in this example, on the top and the bottom of a display screen 217 in accordance with the present invention. STT 205 receives programming from the service provider 105 via a tuner system 230, and the tuner system 230 forwards a filtered primary program to a processor 235. A primary decoder/renderer 240 decodes the program and forwards it to a compositor 245 for splicing multiple programs to provide a single stream. A DENC 248, which is a special purpose digital-to-analog converter for outputting both composite and component analog video, formats the program for viewing on the television 210. Another embodiment is to use a radio frequency (RF) modulator and/or a digital transmitter, such as DVI or HDMI, in place of the DENC 248 to provide the program to the television 210. If the filtered program is a movie, for example, that is produced using a 16:9 aspect ratio and the television 210 is a full screen television having a 4:3 display screen, the processor 235 converts the 16:9 aspect ratio of the program to a 4:3 aspect ratio. Subsequently, letterboxing 215, or grey bars, are rendered on the display screen 217.

In accordance with the present invention, data can be inserted into the horizontal bars 215 at any time over or within the grey bars. A secondary decoder/renderer 255 can decode the data and the compositor 245 will combine the primary program and the data for display by compositing the data in the horizontal bars. The compositor 245 is a graphic display element that is designed to composite different graphical and programming images for simultaneous display. For example, the compositor 245 may be used to superimpose program guide information over a live video showing on the display screen. The compositor 245, in accordance with the present invention, composites data into the display screen and composites graphical bars that block the display of data depending upon the application.

Figure 3:
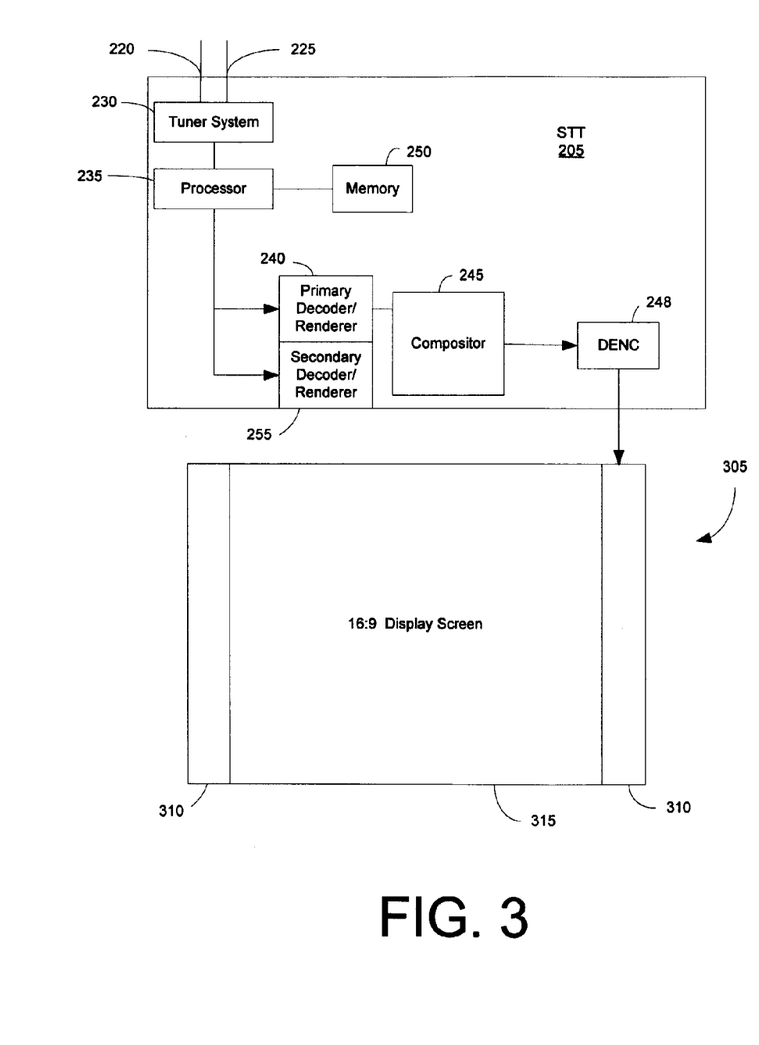
FIG. 3 is a block diagram of the STT 205 coupled to a widescreen television 305 with data space in vertical bars 310 on the sides of the display screen in accordance with the present invention.

FIG. 3 is a block diagram of the STT 205 coupled to a widescreen television 305 with data space available in vertical bars 310 on the sides of the display screen in accordance with the present invention. In this example, the processor 235 may receive a tuned program in a 4:3 aspect ratio. The processor 235 converts the 4:3 aspect ratio program to a 16:9 aspect ratio for viewing on the widescreen television 305. Subsequently, the processor 235 adds the vertical boxes 310 along with spliced data displayed on the sides of the display screen 315 in accordance with the present invention. Alternatively, as mentioned, the compositor 245 may block undesired inserted data by rendering graphical bars over that area 310.

Figure 4:
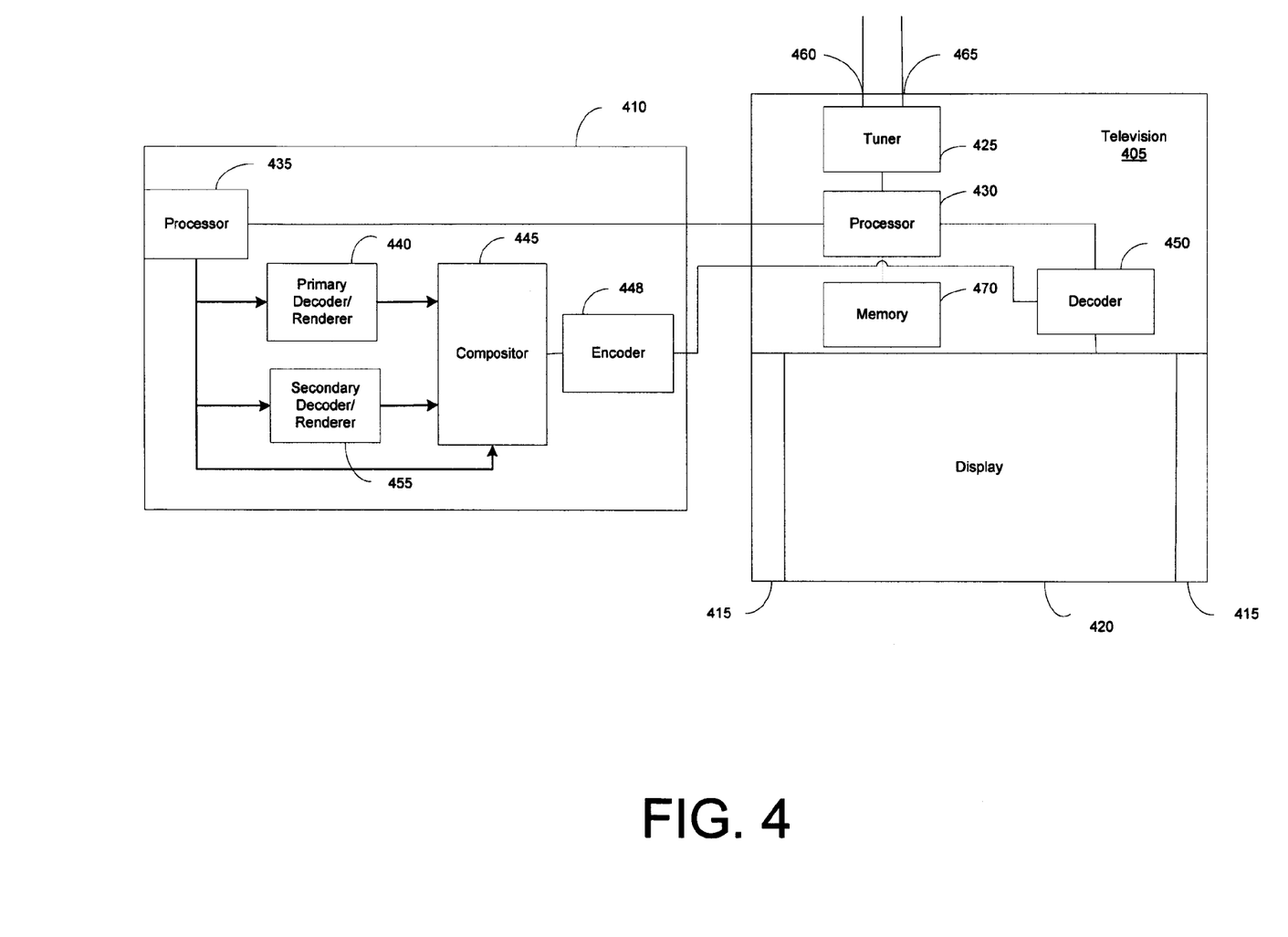
FIG. 4 is a block diagram of a cable-ready television 405 including a cable card 410 having the capability of compositing and blocking data in vertical (or horizontal) bars 415 of a display screen 420 in accordance with the present invention.

FIG. 4 is a block diagram of a cable-ready television 405 including a cable card 410 that is capable of compositing and blocking data that is inserted in vertical (or horizontal) bars 415 of a display screen 420 in accordance with the present invention. A tuner 425 of the television 405 tunes to a desired channel and filters a desired program to a processor 430. If the program requires conversion of its aspect ratio, the processor 430 performs the conversion to match the display screen 420. The program is then provided to a processor 435 in the cable card 410 for further processing. A primary decoder/renderer 440 decodes the program and provides the decoded program to a compositor 445. Additionally, data may be received from the system through the tuner 425 or memory 470 that is intended to be inserted into the streaming program. The processor 435 provides the data to a secondary decoder/renderer 455 for decoding and then to the compositor 445. The compositor 445 directs the data to be inserted, in this case, into the area of the vertical bars 415 and provides a single composited stream. An encoder 448 encodes the composited stream; after which, a decoder 450 in the television 405 decodes the composited stream depending upon the application. The composited stream is then displayed on the television where the program is displayed in the display screen 420 and the composited data is displayed in the vertical bars 415. If the service provider desires to block any inserted data into streaming programs, the compositor 445 would then graphically render vertical bars over the inserted data, thereby blocking the view of the data.

Figure 5:
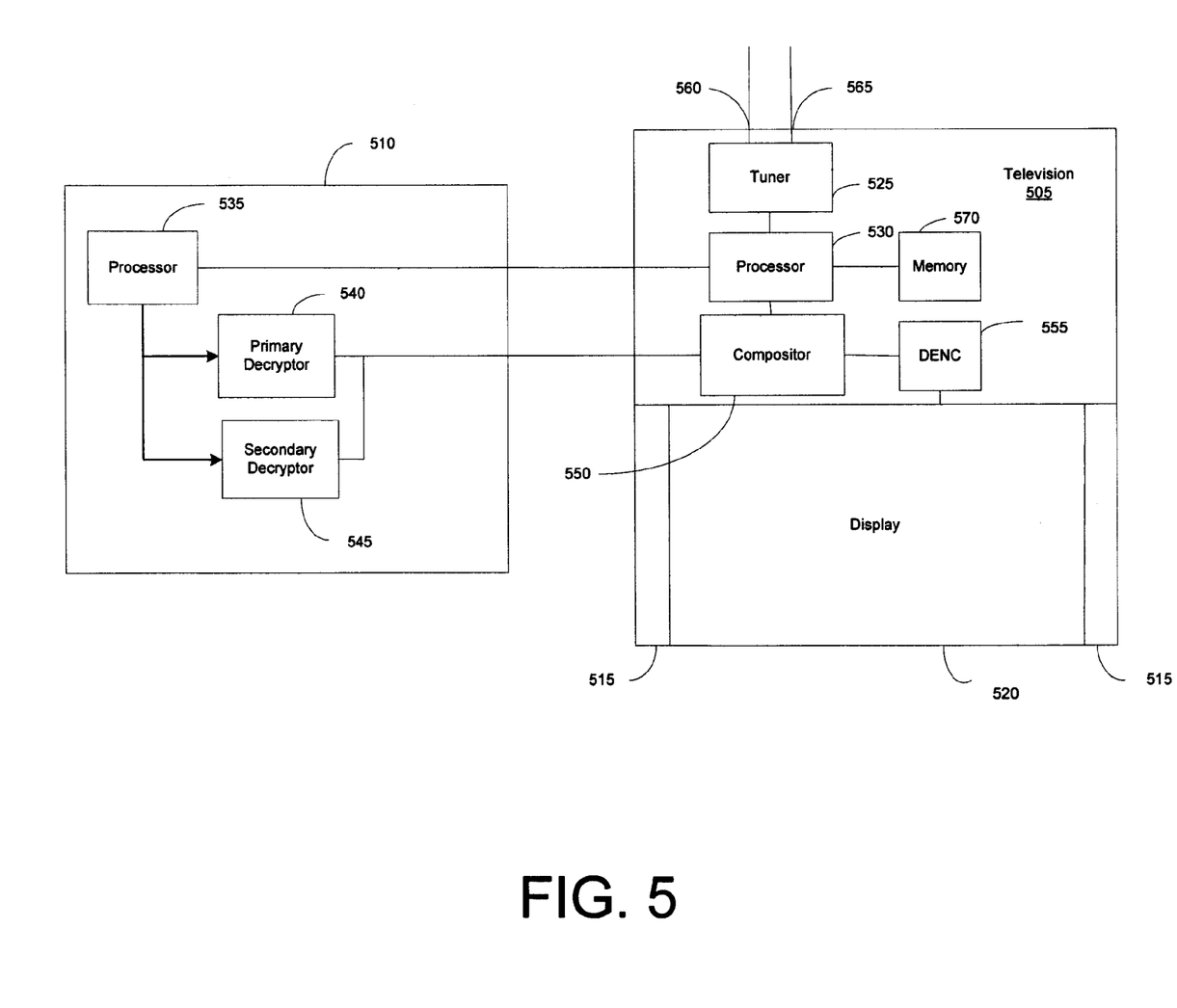
FIG. 5 is a block diagram of cable-ready television 505 including a cable card 510 that provides the television 505 two single streams and the television 505 composites and blocks the streams in accordance with the present invention.

FIG. 5 is a block diagram of cable-ready television 505 including a cable card 510 that provides the television 505 two single streams and the television 505 composites and blocks the streams in accordance with the present invention. A tuner 525 receives data from a system path 560, 565 and filters a desired program to a processor 530. The processor 530 may then provide the program to a cable card processor 535. A primary decryptor 540 decrypts the program before providing the program to a compositor 543 of the television 505. A secondary decryptor 545 may receive other data for decrypting. The decrypted program is then provided to the compositor 543. The compositor 543 then composites the program and the other data into a single stream that is provided to a DENC 555. A display screen 520 then displays the program and the other data is displayed in the vertical bars 515. Again, as mentioned, the compositor 543 may also receive the other data from the secondary decoder/renderer 545 and block the viewing of the data by compositing graphical bars in the vertical bars that block the inserted data.

Figure 6:
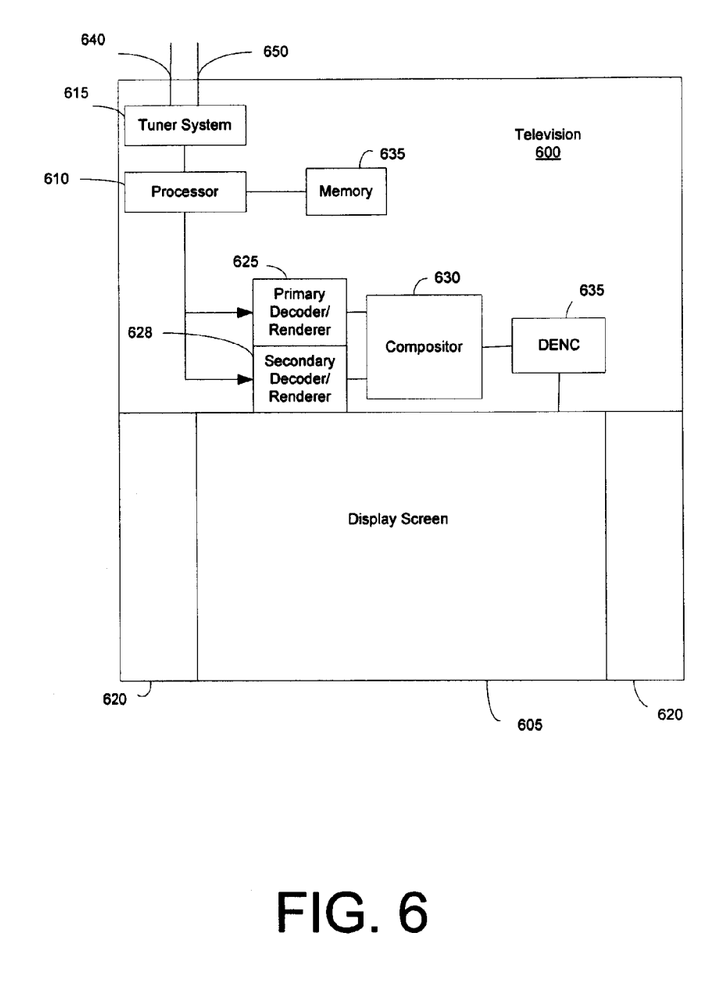
FIG. 6 is a block diagram of a cable-ready television 600 that converts the aspect ratio of a tuned program and may composite and/or block data from the horizontal or vertical bars depending upon application in accordance with the present invention.

In a further embodiment of the present invention, FIG. 6 is a block diagram of a cable-ready television 600 that converts the aspect ratio of a tuned program and includes data in horizontal or vertical bars depending upon application. In this case, the television 600 does not require a STT or a cable card. An included processor 610 receives a filtered program from a tuner system 615 in either a 4:3 or 16:9 aspect ratio. The processor 610 is then capable of converting the aspect ratio for the appropriate television display screen 605, in this case a widescreen television, and additionally inserting data into vertical bars 620 by combining the data with the tuned program via a compositor 630. Finally, a DENC 635 decodes the tuned program and the data for display. It will be appreciated that the television 600 may alternatively be a full screen television, and the processor 610 may then render horizontal bars along with data. Additionally, as with the STT 205 above, the televisions 505, 600 may also prevent undesired data from being inserted into the vertical or horizontal fields and simply render graphical bars in the areas that is intended for the inserted data.

In one embodiment of the present invention, data can be provided directly from the service provider 105 in a separate MPEG stream that is multiplexed onto the transport stream. The data can be graphics or video content. The data may also be provided to the STTs 205, cable cards 410, 510, and the televisions 505, 600 via any input port, such as an out-of-band input port, a DOCSIS port, a USB, or a serial port. By way of example, a first input port 220, 460, 560, 640 receives the programming content and a second input port 225, 465, 565, 650 receives the data. The compositor 245, 445, 543, 630 under direction of the processor then graphically render the received data by compositing the data content in horizontal or vertical bars, for example, with the tuned program as explained above. A further example for delivering the data includes inserting the data in vertical blanking information (VBI) data and instructed to display in the horizontal or vertical bars.

It will be appreciated that the composited data can be specific, e.g., relating to the movie or program currently showing, it can be demographically directed, or it can be television information, such as volume control or current channel number, to name a few. By way of example, when a program, such as the Universal Studios "Jimmy Neutron" is tuned and showing on the display, a paid advertisement may be transmitted from the service provider 105 regarding information about Universal Studios theme park. The paid advertisement is then composited with the program to display "Jimmy Neutron" in the display screen and the paid advertisements somewhere around the display screen. Additionally, data may be transmitted from the service provider 105 regarding a local restaurant advertising this weekend's special. The data that may be composited onto the bars are numerous and provide the system operator or television manufacturer with many options. In some embodiments, the data in one bar may be unrelated to the data in the other bar around the display screen. For example, at the same time, the data in one bar may be related to the program wherein the data in the other bar is not.

In another embodiment of the present invention, data can be provided to the STT 205 and/or the televisions 405, 505, 600 and stored in internal memory 235 (FIG. 2), 470 (FIG. 4), 570 (FIG. 5), 635 (FIG. 6). At a desired time, the data can be retrieved from memory 235, 470, 570, 635 and then inserted into the display screen by one of the systems explained above. More specifically, in FIGS. 2 and 3, the processor 235 retrieves stored data and provides the data to either the secondary decoder 255 or directly to the compositor 245. Referring to FIG. 4, the processor 430 retrieves stored data from memory 470 and sends it to the cable card processor 435 for decoding and compositing into the vertical (or horizontal) bars 415. Referring now to FIG. 5, the processor 530 retrieves stored data from memory 570 and provides it to the vertical bars (or horizontal bars) 515 via the compositor 543 and DENC 555. Alternatively, the processor 530 may provide it to the decoder 545 with specific instructions to display in the bars 515. Similarly, stored data may be retrieved from memory 635 and provided to the secondary decoder/renderer 628 for compositing into a single program.

One way that the processors of each of the above-mentioned examples know to retrieve data from memory is to receive an embedded insert cue in a known manner. More specifically, an embedded cue may be received that directs the processor in the STT 205 and/or the televisions 405, 505, 600 to retrieve the stored data and render it onto the vertical or horizontal bars of the display. A second embedded cue, which may be referred to as a discontinue insert cue, may then be received directing the processor to stop inserting the data. The processor then may switch back to plain horizontal or vertical bars, if desired. Additionally, timing of the data insertion could also be tied to digital program insertion (DPI) ad-insertion tags in the incoming transport stream.

Accordingly, systems and methods have been described that enable a system operator or television manufacturer, to name a couple, the ability to insert data into a program that is being viewed. It will also be appreciated that regardless of the aspect ratio of the received primary program, the processor can convert the program to provide horizontal or vertical bars. Additionally, the graphical bars do not necessarily have to be along the edges of the display; the graphical bars can be anywhere through the display image. It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and protected by the following claims.

The invention claimed is:

1. A method of receiving and displaying data, the method comprising:
    converting an aspect ratio of a program to provide one of horizontal space bars or vertical space bars;
    receiving data from a transport stream;
    storing the received data in memory;
    determining when the data is not authorized by a service provider;
    providing a composite view of the program including the data on a display screen upon reaching an insert cue embedded in the program by retrieving the received data from the memory, wherein the insert cue is linked to a digital program insertion tag in the transport stream, wherein the data is composited into at least one of the horizontal space bars or vertical space bars on the display screen, wherein the data in one bar is different from the data in other bar, and wherein the timing of the data insertion is tied to digital program insertion (DPI) ad-insertion tags in the transport stream; and
    covering, when the data is not authorized, the data composited into the at least one of the horizontal space bars or vertical space bars, wherein covering the data comprises graphically rendering a graphical bar over an area that is intended for the data to prevent the data from being displayed.

2. The method of claim 1, further comprising providing the graphical bar to replace the data when an embedded discontinue cue is received.

3. The method of claim 2, wherein the discontinue cue may be one of a service provider cue or tuning away from viewing the program.

4. The method of claim 1, wherein the data is received through a separate port than the program.

5. The method of claim 1, wherein a set-top box (STT) receives the program and the data, and wherein the STT compositely renders the data into one of the horizontal space bars or vertical space bars.

6. The method of claim 1, wherein a television receives the program and the data, and wherein the television compositely renders the data onto one of the horizontal space bars or vertical space bars.

7. The method of claim 1, wherein a cable card receives the program and the data, and wherein the cable card compositely renders the data into one of the horizontal space bars or vertical space bars.

8. The method of claim 1, wherein a television receives the program and the data from a cable card, and wherein the television compositely renders the data into one of the horizontal space bars or vertical space bars.

9. The method of claim 1, wherein the data is related to the program.

10. The method of claim 1, wherein the data is unrelated to the program.

11. The method of claim 1, wherein the data is correlated demographically to a subscriber.

12. A method of receiving and displaying data, the method comprising:
    converting an aspect ratio of a program to provide space bars across at least one edge of the program;
    receiving data from a transport stream;
    storing the received data in memory;
    providing a composite view of the program including the data on a display screen upon reaching an insert cue embedded in the program by retrieving the received data from the memory, wherein the insert cue is linked to a digital program insertion tag in the transport stream, wherein the data is composited into at least one of the horizontal space bars or vertical space bars on the display screen, wherein the data in one bar is different from is not related to the data in other bar, and wherein the timing of the data insertion is tied to digital program insertion (DPI) ad-insertion tags in the transport stream;
determining when the data is not authorized by a service provider;
responsive to reaching a discontinue cue linked to a digital program tag in the transport stream and embedded in the program, blocking the received data from being added into the at least one edge of the program; and
covering, when the data is not authorized, the data composited into the least one of the horizontal space bars or vertical space bars, wherein covering the data comprises graphically rendering a graphical bar over the data to prevent an area that is intended for the data from being displayed.

13. The method of claim 12, wherein the data is received from one of an external source or an internal source.

14. The method of claim 12, wherein the data is received in response to a subscriber action.

15. A television for inserting data surrounding a program, the television comprising:
a processor for:
receiving a program, having a program tag, and data, converting an aspect ratio of the program to provide one of horizontal or vertical bars on either side of the program,
storing the received data in memory, and
determining when the data is not authorized by a service provider; and
a compositor for:
compositing the data into one of the horizontal or vertical bars on a display screen upon reaching an insert cue embedded in the program by retrieving the data from the memory, wherein the insert cue is linked to the program tag, wherein the data in one bar is different from is not related to the data in other bar, and wherein the timing of the data insertion is tied to digital program insertion (DPI) ad-insertion tags in the transport stream, and
covering the data not authorized by graphically rendering a graphical bar over an area that is intended for the data when the data is not authorized.

16. The television of claim 15, wherein when the insert cue is received, the processor for retrieving the stored data and inserting the data.

17. A television for blocking received data, the television comprising:
a processor for:
receiving a program, having a program tag, and data, and for converting an aspect ratio of the program to provide one of horizontal or vertical bars on either side of the program, and
storing the received data in memory, and
determining when the data is not authorized by a service provider; and
a compositor for the data previously inserted onto one of the horizontal or vertical bars on a display screen upon reaching a discontinue cue by retrieving the data from the memory, linked to the program tag, embedded in the program, wherein the compositor covers the data by rendering graphical bars over an area that is intended for the data, wherein the data in one bar is different from is not related to the data in other bar, and wherein the timing of the data insertion is tied to digital program insertion (DPI) ad-insertion tags in the transport stream.

18. A set-top box for inserting data outside a program, the set-top box comprising:
a processor for:
receiving a program, having a program tag, and data, wherein the processor converts an aspect ratio of the program to provide space bars on the program,
storing the data in a memory, and
determining when the data is not authorized by a service provider; and
a compositor for:
compositing the data into the space bars on a display screen upon reaching an insert cue embedded in the program, by retrieving the data from the memory, wherein the insert cue is linked to the program tag, wherein the data in one bar is different from is not related to the data in other bar, and wherein the timing of the data insertion is tied to digital program insertion (DPI) ad-insertion tags in the transport stream, and
covering the data not authorized by graphically rendering a graphical bar over an area that is intended for the data when the data is not authorized.

19. The set-top box of claim 18, wherein the set-top is coupled to a DVD player for presenting a DVD program and data included on a DVD, wherein the processor of the set-top inserts the data in one of the space bars on the DVD program.

20. The set-top box of claim 18, wherein the compositor is a graphic display element configured to composite different graphical and programming images for simultaneous display.

21. The set-top box of claim 18, wherein the data is program guide information.

22. The set-top box of claim 18, wherein the data in one bar is related to the program and the data in other bar around the screen is not related to the program.

23. The set-top box of claim 18, wherein the data is television information.

24. The set-top box of claim 18, wherein the data is an advertisement related to the program.

25. The set-top box of claim 18, wherein the data is correlated demographically to a subscriber.

26. The set-top box of claim 18, wherein the data is unrelated to the program.

* * * * *